Feb. 4, 1969  E. E. BUZZA  3,425,278

FLOWMETER

Filed Dec. 22, 1966

EDMUND E. BUZZA
INVENTOR.

BY
ATTORNEY

United States Patent Office 3,425,278
Patented Feb. 4, 1969

3,425,278
FLOWMETER
Edmund E. Buzza, Fullerton, Calif., assignor to Beckman Instruments, Inc., a corporation of California
Filed Dec. 22, 1966, Ser. No. 603,871
U.S. Cl. 73—204        11 Claims
Int. Cl. G01f 1/00

ABSTRACT OF THE DISCLOSURE

A flowmeter in which a pair of flow rate responsive elements, such as thermistors, are positioned in first and second flow channels, at least one of which carries the fluid the flow rate of which is being measured. A pump is mounted in the second channel. A control system including the thermistors produces an output signal proportional to the difference in the rate of flow of fluid in the two channels and delivers such signal to the pump to vary the output of the pump until there is an equal rate of flow of fluid through the channels. The output of the pump is a function of the rate of flow of fluid through at least one of the channels.

---

This invention relates to a meter for measuring the flow rate of fluids, including both gases and liquids.

There are various types of flowmeters available for industrial and laboratory applications but most of them suffer from certain disadvantages. For example, the rotometer has the disadvantage that it must be fixed in a particular physical position for proper operation. The magnetic flowmeter, while being suitable for measuring the flow rate of many fluids, obviously cannot be utilized for measuring the flow rate of nonconductive fluids. In addition, many of the flowmeters available today are temperature and pressure sensitive.

It is, therefore, the principal object of the present invention to provide an improved meter for measuring the flow of either liquids or gases.

Another object of the present invention is to provide a flowmeter which is position insensitive and may be utilized for measuring the flow rate of nonconductive fluids.

According to the principal aspect of the present invention, there is provided a flowmeter having first and second channels with the fluid the flow rate of which is being measured being carried by at least the first channel. A pump is mounted in the second channel for conveying fluid therethrough. Fluid flow rate responsive elements, such as thermistors, are mounted in each of the flow channels. A control system including said elements controls the output of the pump in order to effect an equal flow rate of fluid through the two channels. Means are provided for indicating the output of the pump which output is a function of the rate of flow of fluid through at least one of the flow channels.

Other objects and aspects of the invention will become apparent from the following description taken in connection with the accompanying drawing wherein.

Figure 1:
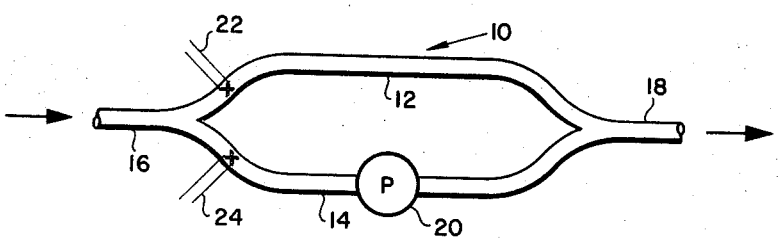
FIG. 1 is a schematic view of one embodiment of the invention.

Referring now to the drawing in detail, wherein like reference characters designate like or corresponding parts throughout the various views, there is shown in FIG. 1 one form of the flowmeter of the invention, generally designated by numeral 10. The flowmeter comprises a pair of parallel flow channels 12 and 14 connected at one end to an inlet duct 16 and at the other end to an outlet duct 18 whereby fluid, either liquid or gas, entering the inlet duct 16 divides into two separate streams in the channels 12 and 14 and rejoin at the outlet duct 18. A pump 20 is positioned in the channel 14 for varying the flow of fluid conveyed through the channel. Preferably the pump is of the positive displacement type, such as a rotary pump, inasmuch as such a pump requires no calibration and its output is directly proportional to the speed of the pump.

Fluid flow rate responsive elements 22 and 24 are positioned in the channels 12 and 14, respectively. These elements are preferably temperature sensitive devices such as thermistors or resistance thermometers which give up an amount of heat and therefore their resistance changes proportional to the flow rate of the fluid passing over the elements. When fluid enters the inlet duct 16, it is partially or totally directed through the channel 12 over the element 22 due to the impedance of the pump 20 to the flow of the fluid to the outlet duct 18 via the channel 14. This results in an unbalance of the resistances of the temperature sensitive elements 22 and 24. This unbalance is employed to produce an electrical signal which increases the output of the pump 20 to a sufficient rate to effect a balance between the elements 22 and 24, which will occur when an equal amount of fluid flows through the channels 12 and 14. The total flow rate of the fluid is then determined by monitoring the output of the pump 20 in terms of flow rate. Since such output is only one-half the total flow rate, the total flow rate through the channels 12 and 14 is computed by doubling that value.

Figure 2:
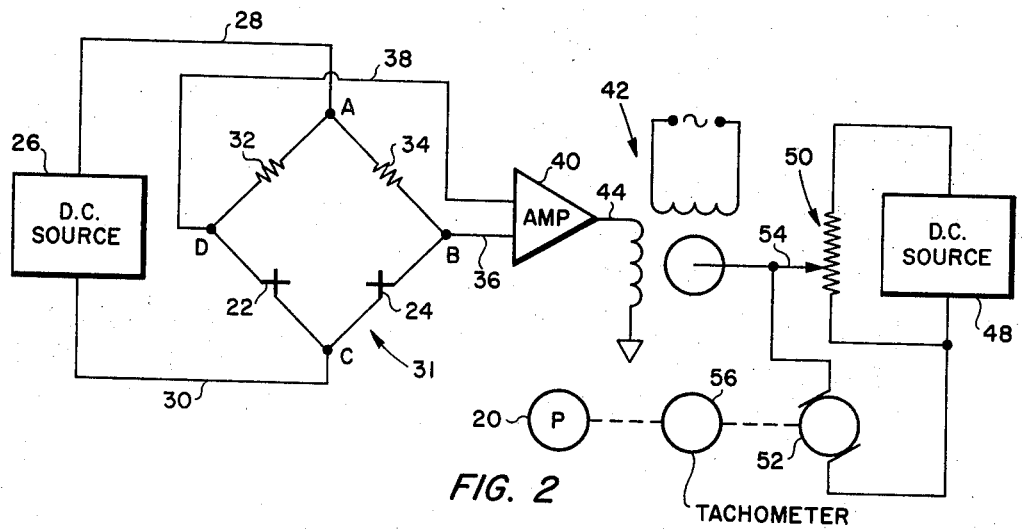
FIG. 2 is a diagrammatic representation of a preferred circuit for controlling the pump used in the flowmeter of the invention.

Reference is now made to FIG. 2 which illustrates an exemplary form of the control circuit for the invention. The control circuit includes a DC source 26 connected through conductors 28 and 30 to nodes A and C of a Wheatstone bridge 31 and the thermistors 22 and 24 are connected in the legs CD and BC thereof. The balanced fixed resistors 32 and 34 are in the AD and AB legs with the output from the Wheatstone bridge being taken off between nodes B and D by conductors 36 and 38.

It can be appreciated that when a fluid enters the duct 16 with a majority of the fluid being diverted to the channel 12 due to the impedance of the pump 20 in channel 14, the resistances of the thermistors 22 and 24 will differ whereby an output signal will be developed by the Wheatstone bridge which is proportional to the difference in the rate of flow of fluid in the channels 12 and 14.

The output signal from the Wheatstone bridge is delivered by conductors 36 and 38 to a chopper input voltage amplifier 40 which converts the DC level into a corresponding phase difference voltage. Said voltage drives a phase sensitive balancing motor 42 connected to the output of the amplifier 40 via a conductor 44.

A direct current source 48 supplies power through a voltage divider 50 to a pump motor 52 with the wiper 54 of the voltage divider being controlled by the balancing motor 42. The output of the pump may be determined by monitoring the output of the amplifier 40 or, as shown in FIG. 2, by use of a tachometer connected to the pump shaft.

The balancing motor 42 being energized by the amplifier 40 will move the wiper 54 of the voltage divider to such a position that the pump motor 52 will restore the thermistor signals to balance by producing an equal flow rate of fluid through the channels 12 and 14. At this point, the Wheatstone bridge signal will be zero and the balance motor 42 will stop so that the pump supply voltage and, therefore, the speed of the pump 20 will remain constant. The flow rate is then computed by monitoring the speed of the pump by the tachometer 56 which indicates one-half of the total flow rate of fluid being monitored.

Figure 3:
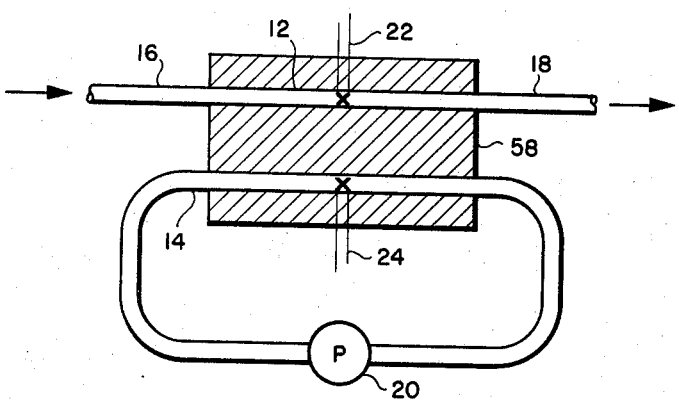
FIG. 3 is a schematic showing of a second embodiment of the invention.

In an alternative form of the invention, the channels 12 and 14 are without fluid communication in contrast to the system illustrated in FIG. 1. As seen in FIG. 3, the flow channel 14 is in the form of a continuous loop including the pump 20 with the thermistor 24 being disposed within the loop and the thermistor 22 being positioned in the channel 12. The thermistors 22 and 24 are connected into the Wheatstone bridge circuit illustrated in the control circuit of FIG. 2 which controls the speed of the pump 20 in the same fashion as described above. However, in contrast to the system shown in FIG. 1, in FIG. 3 the output of the pump 20 as monitored by the tachometer 56 or other suitable means indicates the total flow rate of the fluid being monitored if the fluid in channel 14 has the same thermal conductivity as the fluid in channel 12. Thus, it is necessary in this embodiment of the invention that the fluid in the channel 14 be selected so that it has the same thermal conductivity as that of the fluid being monitored through the flow channel 12. In order to prevent a temperature gradient from occurring between the two channels 12 and 14 in FIG. 3 caused by external conditions, it is desirable to provide a constant temperature block 58 which maintains the temperature of the flow channels 12 and 14 equal. The block 58 may be heated by any suitable means such as by a heated resistance element or hot water jacket, not shown.

The embodiment of the invention illustrated in FIG. 3 has the advantage that it may be utilized in those cases in which the fluid the flow rate of which is being monitored is highly corrosive and, therefore, cannot be directed through the pump 20. By separating the flow channels 12 and 14, a noncorrosive fluid may be utilized in the flow loop 14 which carries the pump 20. In addition, this system has the advantage that it may be used when the fluid being monitored cannot be contaminated by passing through a pump, such as when monitoring the flow rate of blood of a patient. In either case, as stated above, the fluid in the channels 12 and 14 must have the same thermal conductivity.

It can be appreciated from the above description that the flowmeter of the invention is position, temperature and pressure insensitive and may be utilized for monitoring the flow rate of nonconductive fluids as well as conductive fluids. In addition, the flowmeter of the invention is reversible, that is, it may be utilized for measuring the flow rates of fluids entering either the duct 16 or duct 18.

Although two embodiments of the invention have been disclosed herein for purposes of illustration, it will be understood that various changes can be made in the form, details, arrangement and proportions of the various parts in such embodiments without departing from the spirit and scope of the invention as defined by the appended claims.

What is claimed is:

1. A meter for measuring the flow rate of a fluid comprising:
   first and second flow channels with at least said first channel carrying said fluid;
   pump means for conveying a fluid through said second flow channel;
   temperature sensitive means in each of said flow channels responsive to the rate of flow of fluid through said channels;
   means including said temperature sensitive means for producing an output signal proportional to the difference in the rate of flow of fluid in said channels and for delivering said output signal to said pump means to vary the output of said pump means until there is an equal flow of fluid through said channels; and
   indicator means for indicating the output of said pump means as a function of the rate of flow of fluid through at least one of said channels.

2. A meter for measuring the flow rate of a fluid comprising:
   first and second flow channels with at least said first channel carrying said fluid;
   pump means in said second flow channel for conveying a fluid through said channel;
   a motor for driving said pump means;
   temperature sensitive means in each of said flow channels responsive to the rate of flow of fluid through said channels;
   circuit means including said temperature sensitive means for producing an output signal proportional to the difference in the rate of flow of fluid in said channels;
   control means electrically connected to said circuit means and said motor for varying the output of said motor until there is an equal flow rate of fluid through said channels; and
   indicator means for indicating the output of said pump means as a function of the rate of flow of fluid through at least one of said flow channels.

3. A meter as set forth in claim 2 wherein said temperature sensitive means are thermistors.

4. A meter as set forth in claim 2 wherein said circuit means is a Wheatstone bridge including said temperature sensitive means in two legs thereof.

5. A meter as set forth in claim 2 including fluid inlet and outlet ducts, said inlet duct being in flow communication with one end of said flow channels and said outlet duct being in flow communication with the other end of said flow channels whereby the fluid the flow rate of which is being measured enters said inlet duct and divides into two streams in said flow channels and whereby said indicator means indicates one-half the total flow rate of said fluid.

6. A meter as set forth in claim 2 wherein said first and second flow channels are without fluid communication, with said first flow channel carrying only the fluid the flow rate of which is being measured and said second flow channel being a continuous loop carrying a second fluid, whereby said indicator means indicates the total flow rate of said first fluid when said fluids have substantially the same thermal conductivity.

7. A meter as set forth in claim 6 including means other than the fluid in said channels for maintaining the temperature of said channels equal.

8. A meter as set forth in claim 2 wherein said control means includes a chopper input voltage amplifier electrically connected to said circuit means to receive said output signal, a phase sensitive balancing motor energized by said amplifier, a direct current source, a voltage divider electrically connecting said direct current source to said motor for driving said pump means with the wiper arm of said voltage divider being controllably connected to said balancing motor.

9. A meter as set forth in claim 2 wherein said indicator means is a tachometer connected to said pump means.

10. A meter for measuring the flow rate of fluid comprising:
   first and second flow channels with at least said first channel carrying said fluid;
   pump means for conveying a fluid through said second flow channel;
   fluid flow rate responsive means in each of said flow channels;

means including both said fluid flow rate responsive means for producing an output signal proportional to the difference in the rate of flow of fluid in said channels and for delivering said output signal to said pump means to vary the output of said pump means until there is an equal flow rate of fluid through said channels; and indicator means for indicating the output of said pump means as a function of the rate of flow of fluid through at least one of said channels.

11. A meter as set forth in claim 10 including fluid inlet and outlet ducts, said inlet duct being in flow communication with one end of said flow channels and said outlet duct being in flow communication with the other end of said flow channels whereby the fluid the flow rate of which is being measured enters the inlet duct and divides into two streams in said flow channels and whereby said indicator means indicates one-half the total flow rate of said fluid.

References Cited

UNITED STATES PATENTS

| 2,728,219 | 12/1955 | Martin | 73—30 |
| 2,917,066 | 12/1959 | Bergson | 73—198 X |
| 3,143,880 | 8/1964 | Goldstein et al. | 73—205 |
| 3,279,496 | 10/1966 | Klass et al. | 73—231 X |
| 3,312,106 | 4/1967 | Davis | 73—203 X |
| 3,323,365 | 6/1967 | Goetz | 73—194 X |

RICHARD C. QUEISSER, *Primary Examiner.*

EDWARD GILHOOLY, *Assistant Examiner.*

U.S. Cl. X.R.

73—196